United States Patent
Kudo

(10) Patent No.: US 12,500,405 B2
(45) Date of Patent: Dec. 16, 2025

(54) POWER DISTRIBUTION DEVICE

(71) Applicant: YAZAKI CORPORATION, Tokyo (JP)

(72) Inventor: Hiroshi Kudo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 11 days.

(21) Appl. No.: 18/807,898

(22) Filed: Aug. 16, 2024

(65) Prior Publication Data

US 2025/0079827 A1    Mar. 6, 2025

(51) Int. Cl.
*B60R 16/033*     (2006.01)
*H02H 5/04*       (2006.01)
*H02J 1/08*       (2006.01)

(52) U.S. Cl.
CPC ............ *H02H 5/04* (2013.01); *B60R 16/033* (2013.01); *H02J 1/084* (2020.01)

(58) Field of Classification Search
CPC ........ H02H 5/04; B60R 16/033; B60R 16/03; H02J 1/084; H02J 2310/40; B60L 1/04; B60L 1/16
See application file for complete search history.

(56) References Cited

U.S. PATENT DOCUMENTS

| | | | |
|---|---|---|---|
| 2013/0253722 A1* | 9/2013 | Nakamura | G06F 1/26 700/295 |
| 2021/0039572 A1* | 2/2021 | Nishino | H03K 17/6871 |
| 2022/0045502 A1* | 2/2022 | Sawano | H02H 5/04 |
| 2022/0266780 A1* | 8/2022 | Yamada | B60R 16/033 |

FOREIGN PATENT DOCUMENTS

| | | |
|---|---|---|
| JP | 2022-000363 A | 1/2022 |
| JP | 2023-014748 A | 1/2023 |

* cited by examiner

*Primary Examiner* — Lincoln D Donovan
*Assistant Examiner* — Alex W Lam
(74) *Attorney, Agent, or Firm* — KENEALY VAIDYA LLP

(57) ABSTRACT

There is provided a power distribution device: a first and second power distribution devices. The first power distribution device includes: a first cutoff unit; and a first control unit that controls the first cutoff unit based on a first cutoff characteristic. The second power distribution device includes: a second cutoff unit; and a second control unit that controls the second cutoff unit based on a second cutoff characteristic. The first cutoff characteristic and the second cutoff characteristic are initially set such that the first cutoff time is longer than the second cutoff time. The first control unit executes a cutoff characteristic change process of changing the first cutoff characteristic such that the first cutoff time is longer than the second cutoff time when the in-vehicle device is changed or added and the second cutoff characteristic is changed and the first cutoff time is shorter than the second cutoff time.

4 Claims, 4 Drawing Sheets

POWER DISTRIBUTION DEVICE

CROSS-REFERENCE TO RELATED APPLICATIONS

This application is based on and claims priority under 35 USC 119 from Japanese Patent Application No. 2023-138579 filed on Aug. 29, 2023, the contents of which are incorporated herein by reference.

TECHNICAL FIELD

The present disclosure relates to a power distribution device.

BACKGROUND ART

There is an in-vehicle power distribution device having a function of distributing power from a power source to a plurality of in-vehicle devices, which is intended to cope with additional connection of a new in-vehicle device (for example, see JP2023-014748A and JP2022-000363A). In the power distribution device described in JP2023-014748A, conditions are set for a smoke emission characteristic of an electric wire on an upstream side, a fusing characteristic of a fuse on the upstream side, and a power control characteristic of a switch on a downstream side, and when a sum of currents flowing through a plurality of in-vehicle devices approaches the power control characteristic of the switch on the downstream side, power allocation to the in-vehicle devices is adjusted according to priority. In a power distribution device described in JP2022-000363A, an extension portion including a fuse is provided in a relay device to which trunk line power wiring is connected, and a relay device is further connected via the extension portion.

In the power distribution device described in JP2023-014748A, an operation of an in-vehicle device having a low priority will sacrifice as compared with an in-vehicle device having a high priority. In the power distribution device described in JP2022-000363A, it is necessary to change the extension portion in the relay device every time an in-vehicle device is added or changed, which increases a burden of designing a power protection function. In the power distribution device described in JP2022-000363A, in a situation where a plurality of relay devices are connected in series and parallel, when an in-vehicle device is added or changed on a downstream side, a condition for electric wire protection is not satisfied not only in a relay device on the downstream side but also in a relay device on an upstream side. In this case, problems such as simultaneous cutoff or erroneous cutoff of a switch or fuse on the upstream side and a switch or fuse on the downstream side occur.

SUMMARY OF INVENTION

The present disclosure is to provide a power distribution device capable of establishing electric wire protection from an upstream side to a downstream side without requiring redesign of an electric wire protection function when an in-vehicle device is changed or added.

According to an illustrative aspect of the present disclosure, a power distribution device includes: a first power distribution device configured to distribute power supplied from a power supply device; and a second power distribution device configured to distribute power distributed from the first power distribution device to an in-vehicle device. The first power distribution device includes: a first cutoff unit configured to connect or disconnect a first electric wire that supplies power from the power supply device to the second power distribution device; and a first control unit configured to control the first cutoff unit based on a first cutoff characteristic indicating a relationship between an amount of heat of the first electric wire and a first cutoff time that is a time from a start of energization of the first electric wire to disconnection of the first cutoff unit. The second power distribution device includes: a second cutoff unit configured to connect or disconnect a second electric wire that supplies power from the first power distribution device to the in-vehicle device; and a second control unit configured to control the second cutoff unit based on a second cutoff characteristic indicating a relationship between an amount of heat of the second electric wire and a second cutoff time that is a time from a start of energization of the second electric wire to disconnection of the second cutoff unit. The first cutoff characteristic and the second cutoff characteristic are initially set such that the first cutoff time is longer than the second cutoff time. The first control unit executes a first cutoff characteristic change process of changing the first cutoff characteristic such that the first cutoff time is longer than the second cutoff time when the in-vehicle device is changed or added and the second cutoff characteristic is changed and the first cutoff time is shorter than the second cutoff time.

According to the present disclosure, electric wire protection can be established from an upstream side to a downstream side without requiring redesign of an electric wire protection function when an in-vehicle device is changed or added.

DESCRIPTION OF EMBODIMENTS

Figure 1:
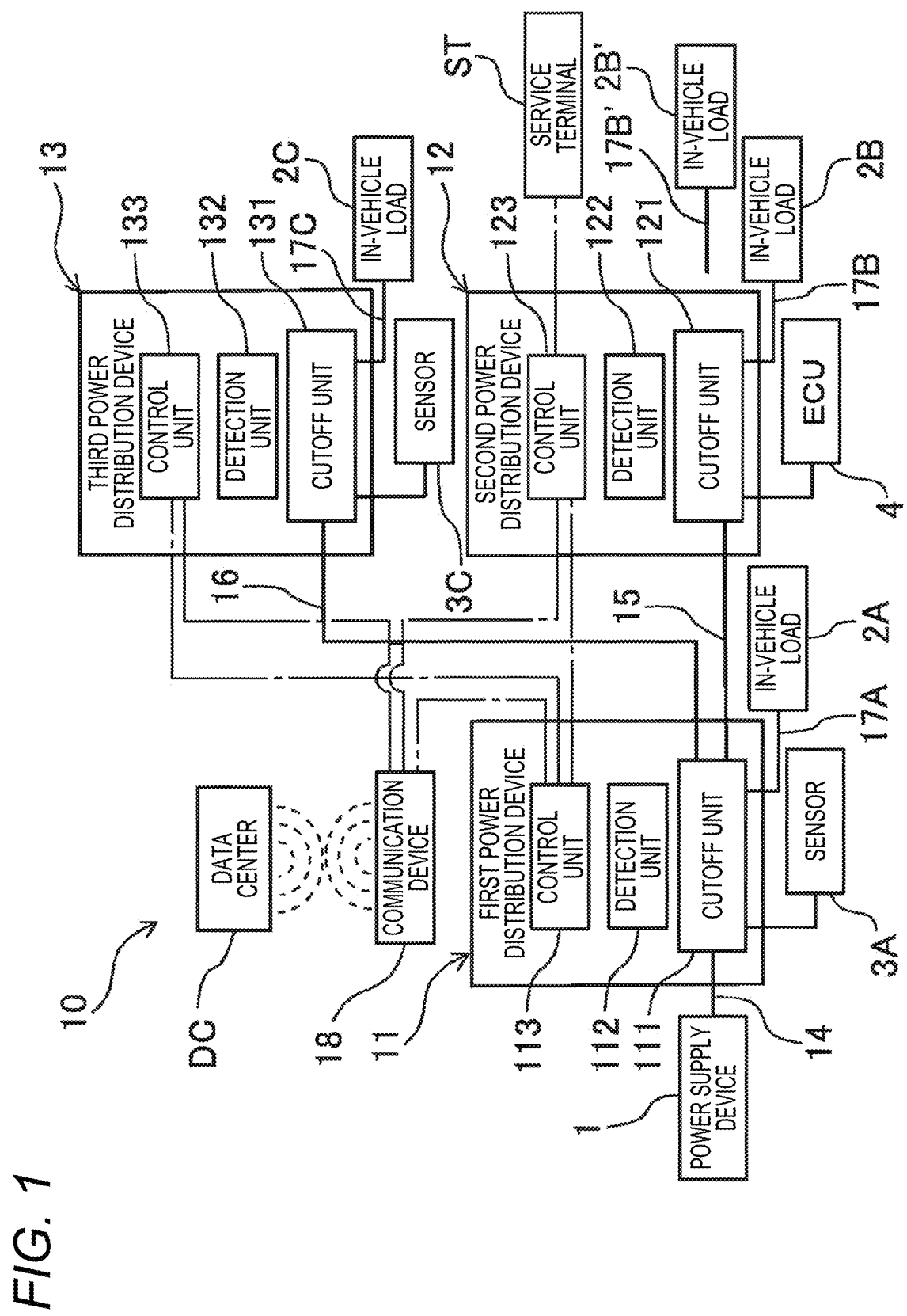
FIG. 1 is a block diagram showing a power distribution device according to an embodiment of the present disclosure.

Hereinafter, the present disclosure will be described with reference to a preferred embodiment. The present disclosure is not limited to the embodiment shown below, and the embodiment shown below can be appropriately changed within a scope not departing from the spirit of the present disclosure. In the embodiment to be described below, a part of configurations may be not described or shown in the drawings, and regarding details of the omitted techniques, publicly known or well-known techniques will be appropriately applied as long as there is no contradiction with the contents to be described below.

FIG. 1 is a block diagram showing a power distribution device 10 according to an embodiment of the present disclosure. As shown in FIG. 1, the power distribution device 10 includes a first power distribution device 11, a second power distribution device 12, and a third power distribution device 13. The power distribution device 10 distributes power supplied from an in-vehicle power supply device 1 to a plurality of in-vehicle devices (in-vehicle loads 2A, 2B, 2B', 2C, sensors 3A, 3C, an electronic control unit (ECU) 4, and the like).

The power supply device 1 is a storage battery such as a lithium-ion battery, a power converter such as a DC/DC converter, and a generator such as an alternator. The in-vehicle loads 2A, 2B, 2B', and 2C are motors, air conditioners, lighting devices, and the like. The sensors 3A and 3C are various in-vehicle sensors such as a camera, a light detection and ranging (LiDAR), a millimeter wave radar, an ultrasonic sensor, a global positioning system (GPS) sensor, an acceleration and gyro sensor, a wheel speed sensor, and an air pressure sensor. The ECU 4 is an electronic control device including a microcomputer, a control area network (CAN) transceiver, an AD converter, and the like.

The first power distribution device 11 is connected to the power supply device 1 by an electric wire 14. The second power distribution device 12 is connected to the first power distribution device 11 by an electric wire 15. The third power distribution device 13 is connected to the first power distribution device 11 by an electric wire 16. That is, the second power distribution device 12 and the third power distribution device 13 are connected to the power supply device 1 via the first power distribution device 11.

The in-vehicle load 2A is connected to the first power distribution device 11 by an electric wire 17A. The sensor 3A is connected to the first power distribution device 11. The in-vehicle load 2B is connected to the second power distribution device 12 by an electric wire 17B. The ECU 4 is connected to the second power distribution device 12. The in-vehicle load 2C is connected to the third power distribution device 13 by an electric wire 17C. The sensor 3C is connected to the third power distribution device 13.

Here, there is a case where the in-vehicle devices connected to the first to third power distribution devices 11 to 13 are changed or added after shipment of a vehicle, for example, the in-vehicle load 2B connected to the second power distribution device 12 is changed to the in-vehicle load 2B' after shipment of the vehicle. In this case, characteristics of an electric wire protection function of the first to third power distribution devices 11 to 13 are automatically changed. This point will be described in detail later.

The first power distribution device 11 includes a cutoff unit 111, a detection unit 112, and a control unit 113. The second power distribution device 12 includes a cutoff unit 121, a detection unit 122, and a control unit 123. The third power distribution device 13 includes a cutoff unit 131, a detection unit 132, and a control unit 133.

The cutoff units 111, 121, and 131 are relays such as semi-conductor relays and mechanical relays. The cutoff unit 111 connects or disconnects the electric wire 14 and the electric wire 15, and connects or disconnects the electric wire 14 and the electric wire 16. The cutoff unit 121 connects or disconnects the electric wire 15 and the electric wire 17B. The cutoff unit 131 connects or disconnects the electric wire 16 and the electric wire 17C.

The sensor 3A is connected to a contact on an upstream side of the cutoff unit 111. Therefore, when the cutoff unit 111 is in a disconnected state, the sensor 3A is supplied with power from the power supply device 1. The ECU 4 is connected to a contact on an upstream side of the cutoff unit 121. Therefore, when the cutoff unit 121 is in a disconnected state and the cutoff unit 111 is in a connected state, the ECU 4 is supplied with power from the power supply device 1. The sensor 3C is connected to a contact on an upstream side of the cutoff unit 131. Therefore, when the cutoff unit 131 is in a disconnected state and the cutoff unit 111 is in a connected state, the sensor 3C is supplied with power from the power supply device 1.

On the other hand, the in-vehicle load 2A is connected to a contact on a downstream side of the cutoff unit 111 by the electric wire 17A. Therefore, when the cutoff unit 111 is in a disconnected state, power is not supplied from the power supply device 1 to the in-vehicle load 2A. The in-vehicle load 2B is connected to a contact on a downstream side of the cutoff unit 121 by the electric wire 17B. Therefore, when the cutoff unit 121 is in a disconnected state, power is not supplied from the power supply device 1 to the in-vehicle load 2B regardless of a state of the cutoff unit 111. The in-vehicle load 2C is connected to a contact on a downstream side of the cutoff unit 131 by the electric wire 17C. Therefore, when the cutoff unit 131 is in a disconnected state, power is not supplied from the power supply device 1 to the in-vehicle load 2C regardless of a state of the cutoff unit 111.

The detection unit 112 detects a voltage and a current of the cutoff unit 111 and transmits detected values to the control unit 113. The detection unit 122 detects a voltage and a current of the cutoff unit 121 and transmits detected values to the control unit 123. The detection unit 132 detects a voltage and a current of the cutoff unit 131 and transmits detected values to the control unit 133.

The control unit 113 includes a timer for measuring an energization time for the electric wires 15 and 16, and a memory for storing information such as a cutoff characteristic of the cutoff unit 111. The control unit 113 determines connection and disconnection of the cutoff unit 111 based on the energization time measured by the timer, the detected value of the detection unit 112, and the cutoff characteristic of the cutoff unit 111 stored in the memory, and transmits a control signal to the cutoff unit 111. The control unit 113 can calculate a temperature (amount of heat) of the connected electric wires 15 and 16 based on information obtained by the detection unit 112.

The control unit 123 includes a timer for measuring an energization time for the electric wire 17B and a memory for storing information such as a cutoff characteristic of the cutoff unit 121. The control unit 123 determines connection and disconnection of the cutoff unit 121 based on the energization time measured by the timer, the detected value of the detection unit 122, and the cutoff characteristic of the cutoff unit 121 stored in the memory, and transmits a control signal to the cutoff unit 121. The control unit 123 can calculate a temperature (amount of heat) of the connected electric wire 17B based on information obtained by the detection unit 122.

The control unit 133 includes a timer for measuring an energization time for the electric wire 17C and a memory for storing information such as a cutoff characteristic of the cutoff unit 131. The control unit 133 determines connection and disconnection of the cutoff unit 131 based on the energization time measured by the timer, the detected value of the detection unit 132, and the cutoff characteristic of the cutoff unit 131 stored in the memory, and transmits a control signal to the cutoff unit 131. The control unit 133 can calculate a temperature (amount of heat) of the connected electric wire 17C based on information obtained by the detection unit 132.

Figure 2:
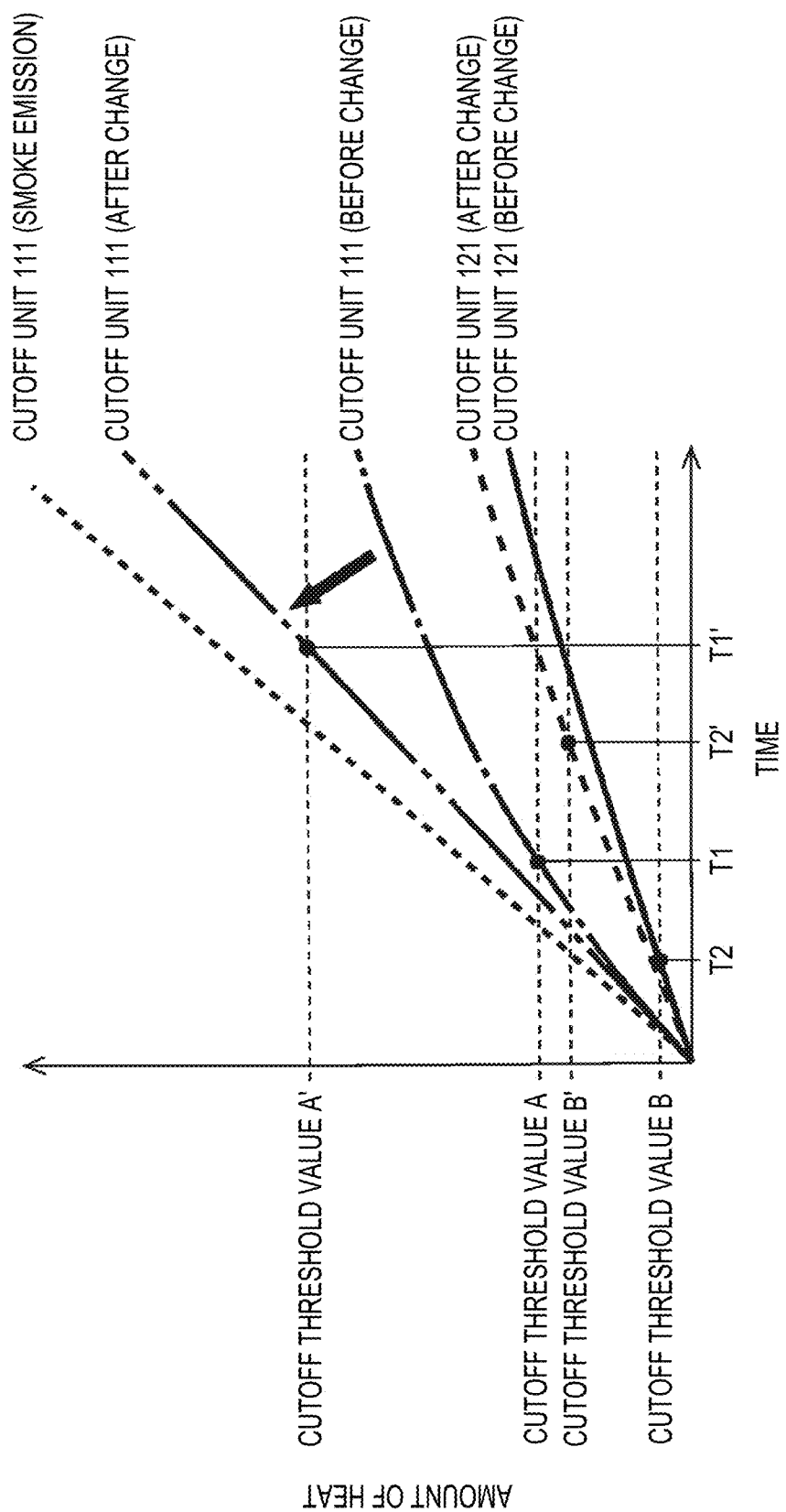
FIG. 2 is a graph showing a relationship between an energization time and a change in an amount of heat of an electric wire.
Figure 3:
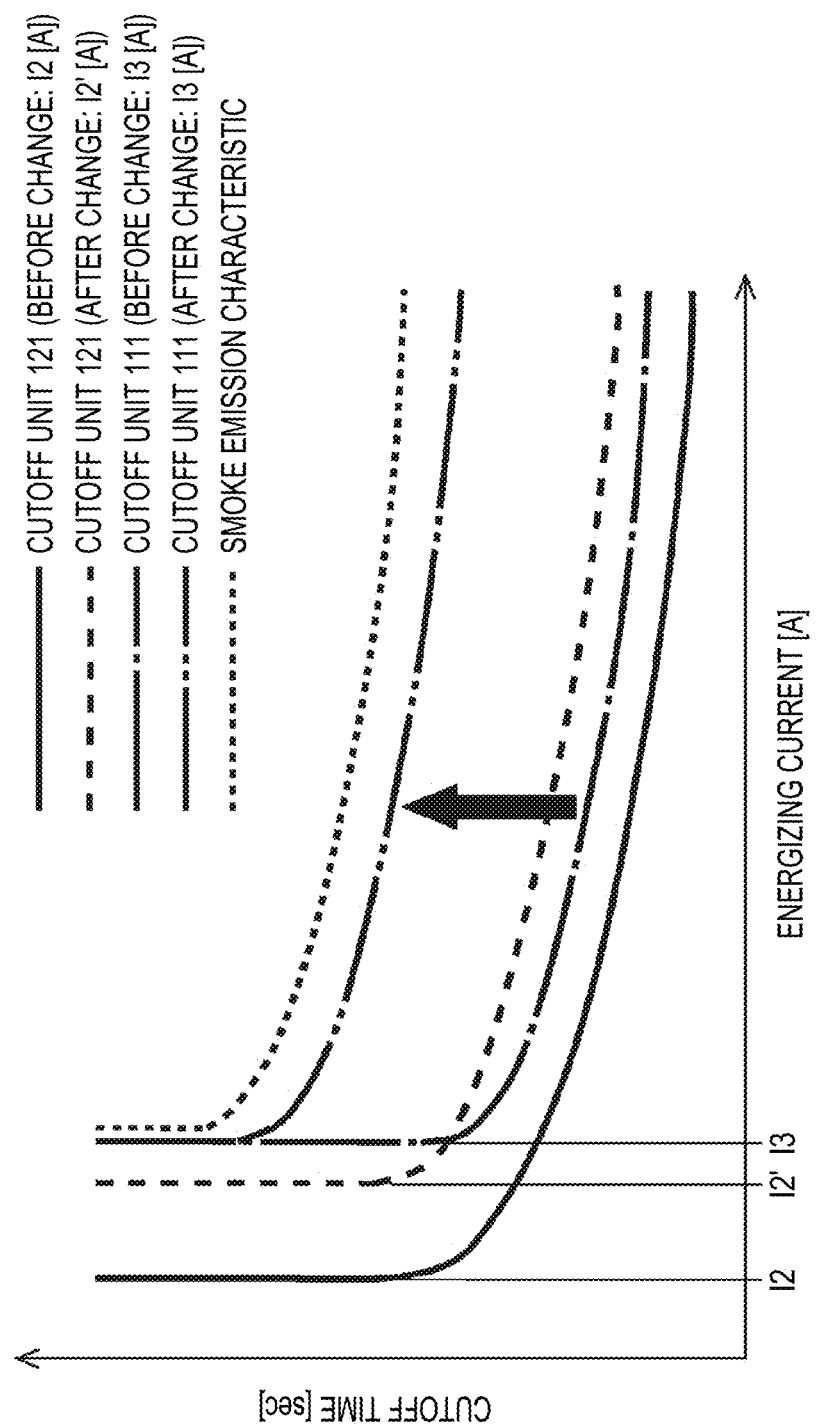
FIG. 3 is a logarithmic graph showing a relationship between an energizing current of an electric wire and a cutoff time of a cutoff unit.

FIG. 2 is a graph showing a relationship between an energization time and a change in an amount of heat of the electric wire 15 and the like. FIG. 3 is a logarithmic graph showing a relationship between an energizing current of the electric wires 15 and 17B and a cutoff time (time from a start of energization to disconnection) of the cutoff units 111 and 121. A vertical axis of the graph is a logarithmic scale.

As indicated by a one-dot chain line and a two-dot chain line in the graph of FIG. 2, the cutoff characteristic of the cutoff unit 111 is defined by a curve line indicating a relationship between an amount of heat of the electric wire 15 and a cutoff time of the cutoff unit 111. As indicated by a solid line and a broken line in the graph of FIG. 2, the cutoff characteristic of the cutoff unit 121 is defined by a curve line indicating a relationship between an amount of heat of electric wires 17B and 17B' and a cutoff time of the cutoff unit 121. Although not shown in the graph of FIG. 2, the cutoff characteristic of the cutoff unit 131 is defined by a curve line indicating a relationship between an amount of heat of the electric wire 17C and a cutoff time of the cutoff unit 131.

The control unit 113 of the first power distribution device 11 reads, from the cutoff characteristic of the cutoff unit 111, a cutoff time (threshold value) corresponding to a temperature (amount of heat) of the electric wires 15 and 16 calculated based on detected values of energizing currents detected by the detection unit 112, and when an energization time measured by the timer exceeds the threshold value, determines cutoff of the cutoff unit 111, and transmits a cutoff signal to the cutoff unit 111. The control unit 123 of the second power distribution device 12 reads, from the cutoff characteristic of the cutoff unit 121, a cutoff time (threshold value) corresponding to a temperature (amount of heat) of the electric wire 17B calculated based on a detected value of an energizing current detected by the detection unit 122, and when an energization time measured by the timer exceeds the threshold value, determines cutoff of the cutoff unit 121, and transmits a cutoff signal to the cutoff unit 121. The control unit 133 of the third power distribution device 13 reads, from the cutoff characteristic of the cutoff unit 131, a cutoff time (threshold value) corresponding to a temperature (amount of heat) of the electric wire 17C calculated based on a detected value of an energizing current detected by the detection unit 132, and when an energization time measured by the timer exceeds the threshold value, determines cutoff of the cutoff unit 131, and transmits a cutoff signal to the cutoff unit 131.

As shown in FIG. 1, the control unit 113 of the first power distribution device 11, the control unit 123 of the second power distribution device 12, and the control unit 133 of the third power distribution device 13 are communicably connected. The control unit 123 of the second power distribution device 12 transmits a detected value of an open circuit voltage of the cutoff unit 121 detected by the detection unit 122 to the control unit 113 of the first power distribution device 11. The control unit 133 of the third power distribution device 13 transmits a detected value of an open circuit voltage of the cutoff unit 131 detected by the detection unit 132 to the control unit 113 of the first power distribution device 11.

The control unit 113 of the first power distribution device 11 compares the detected value of the open circuit voltage of the cutoff unit 121 received from the control unit 123 of the second power distribution device 12 with a detected value of an open circuit voltage of the cutoff unit 111 received from the detection unit 112. The control unit 113 of the first power distribution device 11 determines that the cutoff unit 111 is located upstream of the cutoff unit 121 when the open circuit voltage of the cutoff unit 111 is higher than the open circuit voltage of the cutoff unit 121.

The control unit 113 of the first power distribution device 11 compares the detected value of the open circuit voltage of the cutoff unit 131 received from the control unit 133 of the third power distribution device 13 with the detected value of the open circuit voltage of the cutoff unit 111 received from the detection unit 112. The control unit 113 of the first power distribution device 11 determines that the cutoff unit 111 is located upstream of the cutoff unit 131 when the open circuit voltage of the cutoff unit 111 is higher than the open circuit voltage of the cutoff unit 131. A method of determining an upstream and downstream relationship between the cutoff unit 111 and the cutoff units 121 and 131 is not limited to the method based on the open circuit voltage, and may be replaced by other methods such as storing information indicating the upstream and downstream relationship in advance.

The control units 113, 123, and 133 are communicably connected to an in-vehicle communication device 18 shown in FIG. 1. The communication device 18 is communicably connected to a data center DC via a wireless communication network such as a mobile phone network. The control units 113, 123, and 133 can transmit, to the communication device 18, an acquisition request for information related to a change in the in-vehicle loads 2A, 2B, and 2C (hereinafter, load change information). The communication device 18 can transmit, to the data center DC, the acquisition request for the load change information received from the control units 113, 123, and 133. The data center DC stores load change information related to the cutoff characteristics of the cutoff units 111, 121, and 131, and can transmit the load change information to the communication device 18 in response to the received acquisition request. The communication device 18 can transmit the load change information received from the data center DC to the control units 113, 123, and 133.

The control units 113, 123, and 133 can communicate with a service terminal ST in a wired or wireless manner. The control units 113, 123, and 133 can transmit an acquisition request for the load change information to the service terminal ST. The service terminal ST stores load change information related to the cutoff characteristics of the cutoff units 111, 121, and 131, and can transmit the load change information to the control units 113, 123, and 133 in response to the received acquisition request.

Here, a case where the in-vehicle load 2B connected to the cutoff unit 121 of the second power distribution device 12 is changed to the in-vehicle load 2B' will be described. An example is assumed in which a state in which the in-vehicle load 2B, which is a small lighting device that lights up with a relatively small current, is connected to the cutoff unit 121 by the electric wire 17B of a standard that matches the small current is changed to a state in which the in-vehicle load 2B', which is a large lighting device that lights up with a relatively large current, is connected to the cutoff unit 121 by the electric wire 17B' of a standard that matches the large current.

In this assumed example, as indicated by a solid line in the graph of FIG. 3, a relationship between an energizing current and a cutoff time of the cutoff unit 121 corresponding to the in-vehicle load 2B before a change is initially is set in accordance with an energizing current which is a relatively small current (I2). As indicated by a broken line in the graph of FIG. 3, a relationship between an energizing current and a cutoff time of the cutoff unit 121 corresponding to the changed in-vehicle load 2B' is set in accordance with an energizing current which is a relatively large current (I2').

A smoke emission characteristic of the electric wire 15 indicated by a dotted line in the graph of FIG. 2 (a relationship between an amount of heat and a time from a start of energization to smoke emission (hereinafter, referred to as smoke emission time)) is initially set. A curve line indicating a relationship between an energizing current and a cutoff time of the cutoff unit 111 before a change, which is indicated by a one-dot chain line in the graph of FIG. 3, is initially set so as to fall between a curve line indicating a relationship between an energizing current and a cutoff time of the cutoff unit 121 before a change and a curve line indicating a relationship between an energizing current of the electric wire 15 and a time until smoke is emitted. Although not shown in the graph of FIG. 3, the curve line indicating the relationship between the energizing current and the cutoff time of the cutoff unit 111 before the change is initially set so as to fall between a curve line indicating a relationship between an energizing current and a cutoff time of the cutoff unit 131 and the curve line indicating the relationship between the energizing current of the electric wire 15 and the time until smoke is emitted. That is, the relationship between the energizing current and the cutoff time of the cutoff units 111, 121, and 131 is initially set such that the cutoff time of the cutoff unit 111 is shorter than the smoke emission time of the electric wire 15 and longer than the cutoff time of the cutoff units 121 and 131.

On the other hand, the curve line indicating the relationship between the energizing current and the cutoff time of the cutoff unit 111 before the change indicated by the one-dot chain line in the graph of FIG. 3 intersects a curve line indicating a relationship between an energizing current and a cutoff time of the cutoff unit 121 after the change when the energizing current is I3 (>I2'>I2), and does not fall between the curve line indicating the relationship between the energizing current and the cutoff time of the cutoff unit 121 after the change and the curve line indicating the relationship between the energizing current of the electric wire 15 and the time until smoke is emitted. That is, when the energizing current is equal to or larger than I3, the cutoff time of the cutoff unit 111 is shorter than the cutoff time of the cutoff unit 121. Therefore, when the energizing current is I3, the cutoff unit 111 and the cutoff unit 121 are cut off at the same time, resulting in a situation in which not only the in-vehicle load 2B' but also the ECU 4 cannot operate at the same time when an abnormality occurs in the in-vehicle load 2B'.

Therefore, in the power distribution device 10 according to the present embodiment, when there is a change in the in-vehicle loads 2B and 2C on the downstream side, not only the cutoff characteristics of the cutoff units 121 and 131 corresponding to the changed in-vehicle loads 2B and 2C but also the cutoff characteristic of the cutoff unit 111 on an upstream side are changed. Specifically, first, the control units 113, 123, and 133 acquire detected values of voltages and currents of the cutoff units 111, 121, and 131 from the detection units 112, 122, and 132 every time the power supply device 1 is reset. The control units 113, 123, and 133 determine whether a changing process of the cutoff characteristics of the cutoff units 111, 121, and 131 is necessary according to a change amount in the detected values of the voltages and the currents of the cutoff units 111, 121, and 131. In the above assumed example, since the detected values of the voltages and the currents of the cutoff unit 121 change when the in-vehicle load 2B connected to the cutoff unit 121 is changed to the in-vehicle load 2B', the control unit 123 determines that the changing process of the cutoff characteristic of the cutoff unit 121 is necessary.

When the control units 113, 123, and 133 determine that the cutoff characteristics of the cutoff units 111, 121, and 131 need to be changed, the control units 113, 123, and 133 transmit an acquisition request for load change information to the data center DC or the service terminal ST, and receive the load change information from the data center DC or the service terminal ST. The control units 113, 123, and 133 change the cutoff characteristics of the cutoff units 111, 121, and 131 according to the received load change information.

Next, the control unit 113 of the first power distribution device 11 changes the cutoff characteristic of the cutoff unit 111 so that the curve line indicating the relationship between the energizing current and the cutoff time of the cutoff unit 111 falls between the curve line indicating the relationship between the energizing current and the cutoff time of the cutoff units 121 and 131 after the change and the curve line indicating the relationship between the energizing current of the electric wire 15 and the time until smoke is emitted. Hereinafter, a process of changing the cutoff characteristic of the cutoff unit 111 on the upstream side after changing or adding the in-vehicle loads 2B and 3B on the downstream side will be described.

Figure 4:
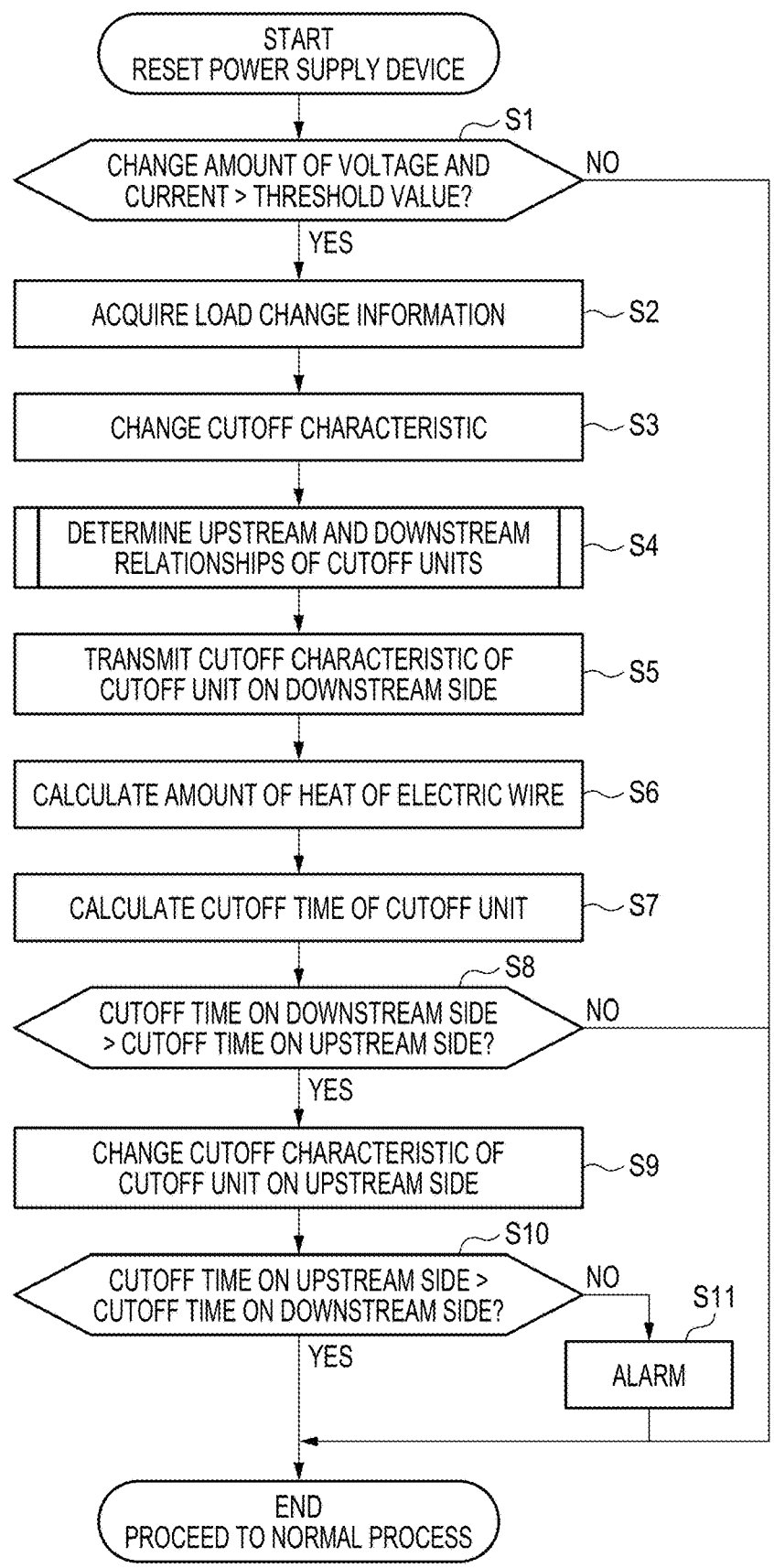
FIG. 4 is a flowchart showing a process for changing a cutoff characteristic of a cutoff unit on an upstream side after an in-vehicle load on a downstream side is changed or added.

FIG. 4 is a flowchart showing a process for changing the cutoff characteristic of the cutoff unit 111 on the upstream side after the in-vehicle loads 2B and 3B on the downstream side are changed or added. The process shown in this flowchart is started when the power supply device 1 is reset.

First, the control units 113, 123, and 133 acquire detected values of voltages and currents of the cutoff units 111, 121, and 131 from the detection units 112, 122, and 132, and determine whether a change amount of the detected value from a previous reset of the power supply device 1 exceeds a threshold value (step S1). If the determination is YES in step S1, the process proceeds to step S2, and if the determination is NO in step S1, the process proceeds to a normal process.

Next, the control units 113, 123, and 133 transmit an acquisition request for the load change information to the data center DC or the service terminal ST, and acquire the load change information such as the cutoff characteristic for the in-vehicle load after the change (step S2). Next, the control units 113, 123, and 133 change the cutoff characteristics of the corresponding cutoff units 111, 121, and 131 based on the acquired load change information (step S3).

Next, the control unit 113 acquires detected values of open circuit voltages of the cutoff units 111, 121, and 131 detected by the detection units 112, 122, and 132, and determines upstream and downstream relationships of the cutoff units 111, 121, and 131 based on the acquired detected values (step S4).

Next, the control unit 123 transmits a cutoff characteristic of the cutoff unit 121 to the control unit 113, and the control unit 133 transmits a cutoff characteristic of the cutoff unit 131 to the control unit 113 (step S5). Next, the control unit 113 calculates an amount of heat of the electric wires 15, 17B, 17B', and 17C (hereinafter, referred to as the electric wire 15 or the like) when a virtual steady current flows through the electric wires 15, 17B, 17B', and 17C, using the following formulas (1) to (6) (step. S6).

When energization of the electric wire 15 or the like is started, the control unit 113 calculates a heat generation amount X1 per unit length of the electric wire 15 or the like using the following formula (1).

[Formula 1]

$$X1 = I^2 \times R_{on} \times \Delta t \tag{1}$$

Where I is a detected value of a current of the detection units 112, 122, and 132, $R_{on}$ is electric resistance per unit length of the electric wire 15 or the like, and $\Delta t$ is a sampling time (for example, 5 msec).

The control unit 113 calculates a heat release amount Y1 of the electric wire 15 or the like using the following formula (2).

[Formula 2]

$$Y1 = Q/(C_{th}^* \times R_{th}/\Delta t) \qquad (2)$$

Where $C_{th}^*$ is a pseudo thermal capacity per unit length of the electric wire 15 or the like, $R_{th}$ is thermal resistance per unit length of the electric wire 15 or the like, $\Delta t$ is a sampling time (for example, 5 msec), and Q is an amount of heat per unit length of the electric wire 15 or the like and is a value obtained by multiplying an electric wire temperature by the pseudo thermal capacity $C_{th}^*$.

The control unit 113 calculates an electric wire temperature $T_n$ using the following formula (3).

[Formula 3]

$$T_n = T_p + (X1 - Y1)/C_{th}^* \qquad (3)$$

Where $T_p$ is a temperature of the electric wire 15 or the like at the time of previous measurement.

That is, every time the sampling time $\Delta t$ elapses, the control unit 113 calculates the electric wire temperature $T_n$ of the electric wire 15 or the like at a current measurement time by sequentially adding the heat generation amount X1 or subtracting the heat release amount Y1 to the temperature $T_p$ of the electric wire 15 or the like at the previous measurement time.

Hereinafter, a method of calculating the pseudo thermal capacity $C_{th}^*$ will be described. As indicated by the curve line indicated by the one-dot chain line in the graph of FIG. 2, when any current continuously flows through the electric wire 15 or the like, an amount of heat of the electric wire 15 or the like increases. It is understood that a temperature T2 of the electric wire 15 and the like at this time is expressed by the following formula (4).

[Formula 4]

$$T2 = T1 + I^2 \times R_{on} \times R_{th}\{1 - e^{(-t/C_{th} \cdot R_{th})}\} \qquad (4)$$

T1 is an ambient temperature, $C_{th}$ is a thermal capacity per unit length of the electric wire 15 or the like, and t is an elapsed time.

The control unit 113 calculates a temperature threshold value $\Delta T_{max}$ expressed by the following formula (5) based on a continuous energizable current $I_{max}$ of a fuse of a standard normally used for the electric wire 15 or the like. The continuous energizable current $I_{max}$ of the fuse can be obtained by actually passing a current through the fuse and measuring a current and a time until the fuse blows.

[Formula 5]

$$\Delta T_{max} = R_{th} \times R_{on} \times I_{max}^2 \qquad (5)$$

The temperature threshold value $\Delta T_{max}$ is an upper limit value of a temperature increase $\Delta T$ with respect to the ambient temperature, and if the cutoff unit 111 is disconnected when the temperature increase $\Delta T$ exceeds $\Delta T_{max}$, the cutoff unit 111 is disconnected with a characteristic equivalent to those of the above-described fuse.

In the above formula (4), when T2−T1=$\Delta T$, the following formula (4') is obtained.

[Formula 6]

$$\Delta T = I^2 \times R_{on} \times R_{th}\{1 - e^{(-t/C_{th} \cdot R_{th})}\} \qquad (4')$$

By appropriately changing the current I in the above formula (4'), increasing the elapsed time t for each current I, and plotting a time when the temperature increase $\Delta T$ reaches the temperature threshold value $\Delta T_{max}$, a curve line showing the relationship between the energizing current and the cutoff time shown in the graph of FIG. 3 is obtained. By multiplying the temperature threshold value $\Delta T_{max}$ by a mass and a specific heat of the electric wire 15 or the like, threshold values of the amount of heat (cutoff threshold value A, cutoff threshold value A', cutoff threshold value B, and cutoff threshold value B') shown in the graph of FIG. 2 are obtained.

By substituting a value of the temperature threshold value $\Delta T_{max}$ calculated by the above formula (5) for $\Delta T$ in the above formula (4'), and modifying the formula so that a left side becomes the thermal capacity $C_{th}$, and further replacing the thermal capacity $C_{th}$ with the pseudo thermal capacity $C_{th}^*$, the following formula (6) is obtained.

[Formula 7]

$$C_{th}^* = \frac{-t}{R_{th}\ln\left(1 - \frac{\Delta T_{max}}{R_{th}R_{on}I^2}\right)} \qquad (6)$$

As shown in the flowchart in FIG. 4, the control unit 113 calculates the cutoff time of each of the cutoff units 111, 121, and 131 when the virtual steady current flows through the electric wire 15 or the like based on the amount of heat and the cutoff threshold value of each of the cutoff units 111, 121, and 131 (step S7).

Next, the control unit 113 determines whether the cutoff time of the cutoff units 121 and 131 is longer than the cutoff time of the cutoff unit 111 (step S8). As shown in the graph of FIG. 2, in an initial setting, the cutoff time T1 of the cutoff unit 111 is longer than the cutoff time T2 of the cutoff unit 121, but after a change of the in-vehicle load 2B, it is expected that the cutoff time T1 of the cutoff unit 111 is shorter than a cutoff time T2' of the cutoff unit 121. As shown in the flowchart in FIG. 4, if the determination is YES in step S8, the process proceeds to step S9, and if the determination is NO in step S8, the process proceeds to a normal process.

The control unit 113 changes a time constant $\tau$ shown in the following formula (7) to change the cutoff characteristic of the cutoff unit 111 so that the cutoff characteristic of the cutoff unit 111 falls between the cutoff characteristics of the cutoff units 121 and 131 after the change and the smoke emission characteristic of the electric wire 15 (step S9). Accordingly, as shown in the graph of FIG. 2, a cutoff time T1' of the cutoff unit 111 is longer than the cutoff time T2' of the cutoff unit 121.

[Formula 8]

$$\tau = C_{th} \cdot R_{th} = \frac{t_{2B'} + t_w}{x \ln\left(1 - \frac{I_{15}}{I_{sim}}\right)} \quad (7)$$

$T_{2B'}$ is a cutoff time of the cutoff unit 121 in a state where the in-vehicle load 2B' after the change is connected by the electric wire 17B'. $t_w$ is a smoke emission time of the electric wire 15. $I_{15}$ is an initial set value of an energizing current of the electric wire 15. $I_{sim}$ is the virtual steady current. x is a real number in a range of 0<x<∞. As x approaches 0, the cutoff characteristic of the cutoff unit 111 approaches the changed cutoff characteristic of the cutoff unit 121. In contrast, as x approaches co, the cutoff characteristic of the cutoff unit 111 approaches the smoke emission characteristic of the electric wire 15.

The above formula (7) is obtained by converting the above formula (6) into the following formula (8) having $\Delta T_{max}$ as a left side, and then converting the following formula (8) into a formula having the time constant τ as a left side, and then converting $\Delta T_{max}$ into a value between a temperature threshold value of the cutoff unit 121 after the change to the in-vehicle load 2B' and a temperature threshold value for the smoke emission characteristic of the electric wire 15.

[Formula 9]

$$\Delta T_{max} = R_{th} R_{on} I^2 \left(1 - e^{(-t/C_{th} \cdot R_{th})}\right) = R_{th} R_{on} I^2 \left(1 - e^{-t/\tau}\right) \quad (8)$$

As shown in the flowchart in FIG. 4, the control unit 113 determines whether the cutoff time of the cutoff unit 111 is longer than the cutoff time of the cutoff units 121 and 131 (step S10). If the determination is YES in step S10, the process proceeds to a normal process, and if the determination is NO in step S10, an alarm process is executed (step S11), and the process proceeds to the normal process.

As described above, in the power distribution device 10 according to the present embodiment, when the in-vehicle loads 2B and 2C connected to the second power distribution device 12 and the third power distribution device 13 on the downstream side are changed or added, the cutoff characteristics of the cutoff units 121 and 131 of the second power distribution device 12 and the third power distribution device 13 are changed. In this situation, when the cutoff time of the cutoff unit 111 of the first power distribution device 11 on the upstream side is shorter than the cutoff time of the cutoff units 121 and 131, the control unit 113 of the first power distribution device 11 on the upstream side changes the cutoff characteristic of the cutoff unit 111 such that the cutoff time of the cutoff unit 111 is longer than the cutoff time of the cutoff units 121 and 131. Accordingly, when the in-vehicle loads 2B and 2C connected to the second power distribution device 12 and the third power distribution device 13 on the downstream side are added or changed, the electric wire 15 and the like from the upstream side to the downstream side can be protected without requiring redesign of the cutoff units 111, 121, and 131. It is also possible to prevent simultaneous cutoff between the cutoff unit 111 on the upstream side and the cutoff units 121 and 131 on the downstream side.

In the power distribution device 10 according to the present embodiment, the cutoff characteristic of the cutoff unit 111 on the upstream side and the cutoff units 121 and 131 on the downstream side are initially set such that the cutoff time of the cutoff unit 111 and the cutoff units 121 and 131 is shorter than the smoke emission time, which is a time from a start of energization to the smoke emission of the electric wire 15. The cutoff characteristics of the cutoff unit 111 and the cutoff units 121 and 131 are initially set such that the cutoff time of the cutoff unit 111 is longer than the cutoff time of the cutoff units 121 and 131. In contrast, in a situation in which the in-vehicle loads 2B and 2C connected to the second power distribution device 12 and the third power distribution device 13 on the downstream side are changed or added and the cutoff characteristics of the cutoff units 121 and 131 are changed, when the cutoff time of the cutoff unit 111 is shorter than the cutoff time of the cutoff units 121 and 131, the control unit 113 changes the cutoff characteristic of the cutoff unit 111 such that the cutoff time of the cutoff unit 111 is longer than the cutoff time of the cutoff units 121 and 131 and shorter than the smoke emission time of the electric wire 15. Accordingly, it is possible to prevent simultaneous cutoff of the cutoff unit 111 on the upstream side and the cutoff units 121 and 131 on the downstream side, and to reliably prevent the electric wire 15 from smoking.

In the power distribution device 10 according to the present embodiment, the control unit 113 on the upstream side and the control units 123 and 133 on the downstream side are communicably connected to each other. The control unit 113 on the upstream side receives the cutoff characteristics of the cutoff units 121 and 131 on the downstream side from the control units 123 and 133 on the downstream side. The control unit 113 on the upstream side calculates, based on the received cutoff characteristics of the cutoff units 121 and 131, the cutoff time of the cutoff units 121 and 131 when a predetermined energizing current flows through the electric wires 17B, 17B', and 17C. The control unit 113 on the upstream side calculates, based on the cutoff characteristic of the cutoff unit 111, the cutoff time of the cutoff unit 111 when a predetermined energizing current flows through the electric wires 15 and 16. When the calculated cutoff time of the cutoff unit 111 is shorter than the calculated cutoff time of the cutoff units 121 and 131, the control unit 113 on the upstream side changes the cutoff characteristic of the cutoff unit 111 such that the cutoff time of the cutoff unit 111 is longer than the cutoff time of the cutoff units 121 and 131. Accordingly, it is possible to compare the cutoff time of the cutoff units 111, 121, and 131 after changing or adding the in-vehicle loads 2B and 2C, and to change the cutoff characteristic of the cutoff unit 111 based on a comparison result.

In the power distribution device 10 according to the present embodiment, the first power distribution device 11 on the upstream side includes the detection unit 112 that detects the voltage and the current of the cutoff unit 111, and the second power distribution device 12 and the third power distribution device 13 on the downstream side include the detection units 122 and 132 that detect the voltage and the current of the cutoff units 121 and 131. The control unit 113 of the first power distribution device 11 receives detected values of voltages and currents of the cutoff units 121 and 131 detected by the detection units 122 and 132 from the control units 123 and 133 of the second power distribution device 12 and the third power distribution device 13. Accordingly, the control unit 113 of the first power distribution device 11 can determine the upstream and downstream relationships of the cutoff units 111, 121, and 131 by comparing the voltage of the cutoff unit 111 on the upstream side and the voltages of the cutoff units 121 and 131 on the downstream side. The control unit 113 of the first power distribution device 11 can calculate an amount of heat of the electric wire 15 or the like based on the currents of the cutoff units 111, 121, and 131.

The present disclosure has been described above based on the above-described embodiment, but the present disclosure is not limited to the embodiment described above, and modifications may be made to the embodiment described above, and publicly known or well-known techniques may be appropriately combined within a scope not departing from the spirit of the present disclosure.

What is claimed is:

1. A power distribution device comprising:
   a first power distribution device configured to distribute power supplied from a power supply device; and
   a second power distribution device configured to distribute power distributed from the first power distribution device to an in-vehicle device, wherein
   the first power distribution device includes:
      a first cutoff unit configured to connect or disconnect a first electric wire that supplies power from the power supply device to the second power distribution device; and
      a first control unit configured to control the first cutoff unit based on a first cutoff characteristic indicating a relationship between an amount of heat of the first electric wire and a first cutoff time that is a time from a start of energization of the first electric wire to disconnection of the first cutoff unit,
   the second power distribution device includes:
      a second cutoff unit configured to connect or disconnect a second electric wire that supplies power from the first power distribution device to the in-vehicle device; and
      a second control unit configured to control the second cutoff unit based on a second cutoff characteristic indicating a relationship between an amount of heat of the second electric wire and a second cutoff time that is a time from a start of energization of the second electric wire to disconnection of the second cutoff unit,
   the first cutoff characteristic and the second cutoff characteristic are initially set such that the first cutoff time is longer than the second cutoff time, and
   the first control unit executes a first cutoff characteristic change process of changing the first cutoff characteristic such that the first cutoff time is longer than the second cutoff time when the in-vehicle device is changed or added and the second cutoff characteristic is changed and the first cutoff time is shorter than the second cutoff time.

2. The power distribution device according to claim 1, wherein
   the first cutoff characteristic and the second cutoff characteristic are initially set such that the first cutoff time and the second cutoff time are shorter than a smoke emission time, which is a time from the start of energization to smoke emission of the first electric wire, and
   the first control unit changes the first cutoff characteristic such that the first cutoff time is longer than the second cutoff time and shorter than the smoke emission time in the first cutoff characteristic change process.

3. The power distribution device according to claim 1, wherein
   the first control unit and the second control unit are communicably connected, and
   the first control unit is configured to:
      receive the second cutoff characteristic from the second control unit;
      calculate the first cutoff time when a predetermined energizing current flows through the first electric wire, based on the first cutoff characteristic;
      calculate the second cutoff time when the predetermined energizing current flows through the second electric wire, based on the second cutoff characteristic; and
      execute the first cutoff characteristic change process when the calculated first cutoff time is shorter than the calculated second cutoff time.

4. The power distribution device according to claim 3, wherein
   the first power distribution device includes a first detection unit configured to detect a voltage and a current of the first cutoff unit,
   the second power distribution device includes a second detection unit configured to detect a voltage and a current of the second cutoff unit, and
   the first control unit receives a detected value of the voltage and the current of the second cutoff unit detected by the second detection unit from the second control unit.

* * * * *